(12) United States Patent
Rotsaert

(10) Patent No.: US 11,212,091 B2
(45) Date of Patent: Dec. 28, 2021

(54) METHOD FOR PAIRING ELECTRONIC TERMINALS, CORRESPONDING TERMINALS AND PROGRAM

(71) Applicant: Ingenico Inc., Boston, MA (US)

(72) Inventor: Christopher Rotsaert, Wasquehal (FR)

(73) Assignee: INGENICO INC., Boston, MA (US)

( * ) Notice: Subject to any disclaimer, the term of this patent is extended or adjusted under 35 U.S.C. 154(b) by 145 days.

(21) Appl. No.: 16/217,826

(22) Filed: Dec. 12, 2018

(65) Prior Publication Data
US 2019/0182036 A1    Jun. 13, 2019

(30) Foreign Application Priority Data

Dec. 12, 2017  (FR) ...................................... 1762011

(51) Int. Cl.
| | | |
|---|---|---|
| *H04L 29/06* | (2006.01) | |
| *H04L 9/08* | (2006.01) | |
| *H04W 76/14* | (2018.01) | |
| *H04W 12/04* | (2021.01) | |
| *H04W 12/50* | (2021.01) | |

(52) U.S. Cl.
CPC ............. *H04L 9/088* (2013.01); *H04W 12/04* (2013.01); *H04W 12/50* (2021.01); *H04W 76/14* (2018.02); *H04L 63/061* (2013.01); *H04L 63/18* (2013.01)

(58) Field of Classification Search
CPC ... H04L 9/088; H04L 9/08; H04L 9/00; H04L 63/061; H04L 63/18; H04W 76/14;
(Continued)

(56) References Cited

U.S. PATENT DOCUMENTS 9,173,098 B1 * 10/2015 Ran ..................... H04W 12/003
10,321,310 B1 *  6/2019 Scheer ..................... H04L 63/08
(Continued)

FOREIGN PATENT DOCUMENTS

FR        2985148 A1     6/2013
WO    2012070036 A1     5/2012

OTHER PUBLICATIONS

French Search Report dated Jul. 30, 2018, for corresponding French Application No. 1762011, filed Dec. 12, 2017.
(Continued)

*Primary Examiner* — Andrew J Steinle
(74) *Attorney, Agent, or Firm* — David D. Brush; Westman, Champlin & Koehler, P.A.

(57) ABSTRACT

A method for pairing a first terminal, called a communications terminal, seeking to transmit and receive data with a second terminal, called an acceptor terminal. The method includes: a first non-secured pairing phase for pairing the transactional terminal with the communications terminal, delivering at least one pairing parameter for pairing with the communications terminal, by using a first radio-type bidirectional wireless communications channel; a second phase of secured pairing of the transactional terminal with the communications terminal, the second pairing phase implementing a second unidirectional communications channel used by the transactional terminal to transmit a piece of securing data from the first communications channel to the communications terminal, as a function of the at least one parameter for pairing with the communications terminal.

11 Claims, 2 Drawing Sheets

(58) Field of Classification Search
CPC ... H04W 76/00; H04W 12/003; H04W 12/00; H04W 12/04; H04W 12/0401; H04W 12/0403; H04W 12/04031; H04W 12/04033; H04W 12/0407; H04W 12/04071; H04W 12/50; H04W 12/65; H04W 84/18
See application file for complete search history.

(56) References Cited

U.S. PATENT DOCUMENTS

| | | | |
|---|---|---|---|
| 2008/0220746 A1* | 9/2008 | Ekberg | H04M 3/16 455/414.1 |
| 2010/0005294 A1* | 1/2010 | Kostiainen | H04W 12/003 713/168 |
| 2014/0281547 A1 | 9/2014 | Modzelewski et al. | |
| 2014/0351904 A1 | 11/2014 | Marsaud et al. | |
| 2017/0279612 A1* | 9/2017 | Liang | H04L 9/30 |
| 2018/0310176 A1* | 10/2018 | Abdelhakim | H04L 63/104 |
| 2019/0015669 A1* | 1/2019 | Muessig | H04W 12/04 |
| 2019/0166635 A1* | 5/2019 | McColgan | H04W 12/0013 |

OTHER PUBLICATIONS

Samta Gajbhiye et al. "Design, Implementation and Security Analysis of Bluetooth Pairing Protocol in NS2", 2016 International Conference on Advances in Computing, Communications and Informatics (ICACCI), IEEE, Sep. 21, 2016.

* cited by examiner

METHOD FOR PAIRING ELECTRONIC TERMINALS, CORRESPONDING TERMINALS AND PROGRAM

1. FIELD OF THE INVENTION

The invention relates to the field of authentication. The invention relates more particularly to the hardware authentication of devices with one another.

2. PRIOR ART

There are numerous well-known protocols in the prior art by which two devices can authenticate themselves prior to the transmission or exchange of confidential information. Such is the case for example of a wireless communications terminal seeking to get authenticated on a user's local-area network, for example a Wi-Fi wireless network. To this end, prior to any data exchange, the terminal must get authenticated on the communications network. This authentication generally requires a phase of entry of a key, a password or a passphrase. One of the problems with this type of pairing is that the terminals must necessarily have means for entering keys, passwords or passphrases.

Other sectors require authentication between wireless devices. This is the case for example with devices that communicate by means of Bluetooth® technology. Bluetooth® is a wireless technology used to create personal wireless networks working in the 2.4 GHz frequency band, requiring no authorization and having a maximum range of about ten meters. The networks are generally formed by nomadic peripherals such as mobile telephones, personal digital assistants and laptop computers. By default, a Bluetooth® communication is not authenticated and any peripheral device can exchange data with any other peripheral device.

A Bluetooth® peripheral (for example a mobile telephone) can choose to ask for authentication to provide a particular service. Bluetooth® authentication is generally done with PIN codes. Again, this type of authentication requires the entry of a key or a PIN code, generally on both terminals wishing to communicate with each other. By default, the user must enter the same PIN code on both peripherals. Once the user has entered the PIN code, the two peripherals generate a link key. Then, this link key can be registered either in the peripherals themselves or on an external storage means. During the following exchange, the two peripherals will use the previously generated link key. This procedure is called coupling. When the link key is lost by one of the peripherals, then the coupling operation must be repeated so that a new key can be generated.

When the data that has to be exchanged between two Bluetooth® terminals is sensitive data (such as bank data for example), the exchanges that follow the coupling phase are encrypted, for example by means of an E0 algorithm. E0 is the stream cipher or stream encryption algorithm used to protect the confidentiality of data in Bluetooth®.

The problem however is the same as for the WEP key or the WPA key; it is necessary prior to any encrypted exchange for the user to enter a PIN code into the terminal, the length of the PIN code varying from 4 to 16 characters, the 16-character PIN code being preferred for applications with the highest security.

Now, such an entry proves to be impossible when at least one of the two terminals does not have an entry keypad. The set of Bluetooth® protocols, especially, cannot be used to obtain a secured connection between two terminals when at least one of these two terminals does not have any means for entering the PIN code. When both terminals possess entry means, there are other additional problems of entry of these codes. Whether it is for Wi-Fi technology or Bluetooth® technology, the entry of a PIN code or of an excessively lengthy key leads to at least two problems:

- on the one hand, there is a major risk of error during entry. Indeed, it is almost certain that the entry will comprise at least one error. This is especially true when the entry is done in masked character mode (the characters entered are not displayed but instead a succession of asterisks is displayed);
- on the other hand, since the entry is manual, there is no certainty that a malicious individual will not spy on the entry process in order to appropriate the PIN code or the key for fraudulent use.

Securing solutions have been proposed, chiefly for the implementation of a Wi-Fi connection. They consist of the almost simultaneous activation of two devices to be connected together. One of these solutions is the "Wi-Fi Protection Setup (WPS)", a secured and simple local-area wireless network standard. This solution however does not resolve all problems since one of the variants of WPS implies the entry of a PIN code.

In other words, it is necessary to provide a connection solution that is both simple and discreet in order, firstly, to avoid errors of entry and, secondly, to ensure the confidentiality of the data needed for the connection or for the pairing.

3. SUMMARY

The invention does not have these drawbacks of the prior art. The invention relates to a method for pairing a first terminal, called a communications terminal, seeking to transmit and receive data with a second terminal, called an acceptor terminal.

According to the present technique, said method comprises, at the level of the acceptor terminal.

a first non-secured pairing phase, for the pairing of said transactional terminal with said communications terminal, delivering at least one pairing parameter for pairing with said communications terminal, by means of a first radio-type bidirectional wireless communications channel;

a second phase of secured pairing of said transactional terminal with said communications terminal, said second pairing phase implementing a second unidirectional communications channel used by said transactional terminal to transmit a piece of securing data from said first communications channel to said communications terminal, as a function of said at least one parameter for pairing with said communications terminal.

Thus, unlike in the case of classic pairing methods, which essentially use a single radio-type, bidirectional communications channel, for example to carry out a pairing, the present technique makes it possible to have a secured pairing that is secured in two phases: a first phase is used to carry out a classic non-secured pairing and thus obtain an identifier of the communications terminal while the second phase is used to obtain a secured pairing complement, taking account of the identifier obtained during the first non-secured pairing phase, in using a unidirectional communications channel. It is really the combination of these two successive pairing phases that makes it possible to obtain the anticipated result, namely the securing of the connection (Bluetooth® connection for example) set up between the first terminal and the second terminal through a non-secured initial connection and to do so without human intervention.

According to the present technique, the second pairing phase comprises, at the acceptor terminal level:
- a step for generating the piece of securing data of said first communications channel;
- a step of transmission, by means of the second unidirectional-use communications channel, of said piece of securing data of said communications channel in the form of a representation;
- a step for generating a challenge by means of said piece of securing data of said first communications channel;
- a step of transmission of said challenge to said communications terminal by means of the first communications channel;
- a step of reception, by means of the first communications channel, of a response to said challenge coming from the communications terminal.

According to the present technique, the second pairing phase comprises, at the communications terminal:
- a step of reception, by means of the second unidirectional-use communications channel, of a representation of said piece of securing data of said first communications channel;
- a step for decoding said representation delivering said piece of securing data of said first communications channel;
- a step of reception, by means of the first communications channel, of said challenge;
- a step of resolution of said challenge by means of said piece of securing data of said first communications channel, delivering a response; and
- a step of transmission, by means of the first communications channel, of the response to said challenge.

Thus, in this second pairing phase, the technique described enables the combination of the pieces of information transmitted via the second communications channel with those transmitted via the first communications channel so that the transactional terminal can set up a secured connection with the communications terminal. When the transactional terminal is capable of verifying that the challenge has been met picked up by the communications terminal, it means that the communications terminal possesses the cryptographic material transmitted by means of the first unidirectional communications channel; the communication between the two terminals are then secured.

According to one particular characteristic, the securing data of said first communications channel is an encryption key.

More particularly, it is a symmetrical encryption key.

This key can thus serve as the basis for the subsequent exchange between the two terminals and/or the building of a crypto-system with even better performance in a subsequent phase, in order to ensure maximum security in the exchanges.

According to one particular embodiment, a representation belongs a type of representation and said type of representation belongs to the group comprising:
- a succession of activations and deactivations of at least one light-emitting diode;
- a sound sequence;
- a message transmitted by an NFC type wireless link or by wire link.

Thus, a hacker must necessarily be in proximity to two terminals in order to try and capture data travelling through the second communications terminal.

According to one particular embodiment, said communications terminal is a smartphone type of smart terminal and said transactional terminal is an enslaved payment terminal of said communications terminal.

According to one particular embodiment, said step of acquisition of said representation by said communications terminal on the second communications channel comprises a step of acquisition of a video sequence representing said representation.

According to one particular embodiment, said step of acquisition of said representation by said communications terminal on the second communications channel comprises a step of acquisition of a sound sequence representing said representation.

The present technique also relates, according to another aspect, to a communications terminal seeking to transmit and receive data with an acceptor terminal, comprising:
- means for implementing a first phase of non-secured pairing with said acceptor terminal, by means of a first radio-type bidirectional wireless communications channel; and
- means for implementing a second non-secured pairing phase with said acceptor terminal by means of a second unidirectional-use communications terminal comprising:
  - means of reception of a representation of a piece of securing data of said first communications channel, by means of the second unidirectional-use communications channel;
  - means for decoding said acquired representation, delivering said piece of securing data of said first communications channel;
  - means of reception, by means of the first communications channel, of a challenge;
  - means of resolution of said challenge by means of said piece of securing data of said first communications channel, delivering a response;
  - means of transmission, by means of the first communications channel, of the response to said challenge.

The present technique, according to another aspect, also relates to a transactional terminal seeking to transmit and receive data with a communications terminal, comprising:
- means for implementing a first non-secured phase of pairing with said acceptor terminal, by means of a first radio-type bidirectional wireless communications channel; and
- means for implementing a second non-secured pairing phase with said acceptor terminal and said second unidirectional-use communications channel comprising:
- means for generating a piece of securing data of said first communications channel, enabling the pairing of said transactional terminal and said communications terminal;
- means of transmission, by means of a second unidirectional communications channel, of said piece of securing data of said first communications channel.

The invention is also aimed at providing an information carrier readable by a data processor and comprising instructions of a program as mentioned here above.

The information carrier can be any entity or device whatsoever capable of storing the program. For example, the carrier can comprise a storage means such as a ROM, for example a CD ROM or a microelectronic circuit ROM or again a magnetic recording means, for example a floppy disk or a hard disk drive.

The information carrier can also be a transmissible carrier such as an electrical or optical signal that can be conveyed via an electrical or optical cable, by radio or by other means. The program according to the invention can especially be uploaded to an Internet type network.

As an alternative, the information carrier can be an integrated circuit into which the program is incorporated, the circuit being adapted to executing or to being used in the execution of the method in question.

According to one embodiment, the invention is implemented by means of software and/or hardware components. In this respect, the term "module" can correspond, in this document, equally well to a software component and to a hardware component or to a set of hardware and software components.

A software component corresponds to one or more computer programs, one or more sub-programs of a program or more generally to any element of a program or a piece of software capable of implementing a function or a set of functions as described here below for the module concerned. Such a software component is executed by a data processor of a physical entity (terminal, server, etc) and is liable to access the hardware resources of this physical entity (memories, recording carriers, communications buses, electronic input/output boards, user interfaces, etc.).

In the same way, a hardware component corresponds to any element of a hardware unit capable of implementing a function or a set of functions as described here below for the module concerned. It can be a programmable hardware component or a component with an integrated processor for the execution of software, for example an integrated circuit, a smartcard, a memory card, an electronic board for the execution of firmware, etc.

4. FIGURES

Other features and advantages of the proposed technique shall appear more clearly from the following description of a preferred embodiment, given by way of a simple illustratory and non-exhaustive example and from the appended drawings, of which:

FIG. 1 describes the general principle of secured pairing as proposed in the present invention;

FIG. 2 describes steps of the second pairing phase;

5. DESCRIPTION OF ONE EMBODIMENT

As explained here above, the present technique offers a novel method of secured pairing (by the use of an encryption key) for the pairing of two devices. The invention can be applied especially to the Bluetooth® pairing technology but can also be applied to other protocols that include possibilities of the use of two successive pairing phases, one non-secured and the other secured. The principle here is that the second phase should be done between two terminals that have already been paired for a first time and that, at the second time, possess a connection of trust, either by the necessary immediate proximity (short-propagation audio-visual message, NFC message) or by direct wire connection or again through a trusted third party between the two terminals (such as the server that already has a secret shared with each of the elements).

In one particular embodiment, which shall be described here below, the solution implements two Bluetooth® terminals, one that initiates the pairing process and the other that accepts it. More particularly, the pairing process takes place between a smart communications terminal, also called a smartphone, and a subordinate payment terminal. The term 'subordinate payment terminal' (transactional terminal) is understood to mean a payment terminal, the functioning of which is conditional on a coupling with a communications terminal: the slave payment terminal needs at least a portion of the resources provided by the communications terminal to be able to carry out payment transactions. Such payment terminals (coupled with communications terminals) are used, for example, as equipment for moving professionals (taxi drivers, members of liberal professions, itinerant tradesmen), who need a compact payment terminal that requires little maintenance, delegating a part of the transaction to the communications terminal or using its resources (for example Wi-Fi, 3G, 4G and other network communication resources) to carry out the transaction.

Here below, reference shall be made respectively to a communications terminal and to a transactional terminal to designate respectively these two terminals, it being understood that the proposed technique can be used in situations other than those described here above, and more particularly in any situation where a secured pairing has to be done.

Figure 1:
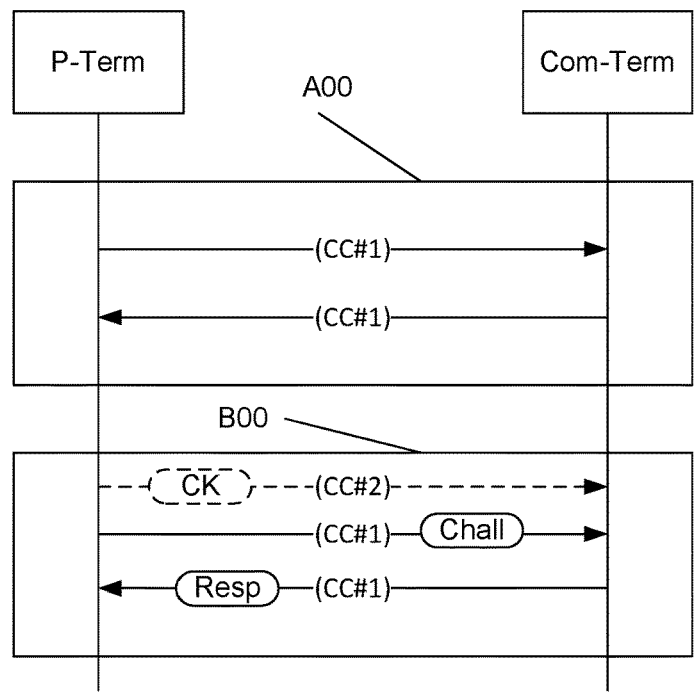

The method is described with reference to FIG. 1. In this context, the communications terminal Com-Term has a unidirectional-use electronic receiver (such as for example a microphone, a peripheral enabling the reading and decoding of images such as cameras embedded in smartphones or other electronic devices of this type), and the transactional terminal P-Term has a unidirectional-use electronic transmitter to transmit a key by means of this transmitter (the transactional terminal more generally has a LED-type visual rendering means or buzzer or speaker type sound device). Other unidirectional transmission technologies (i.e. technologies that do not allow reception on the same channel) can also be envisaged. These technologies are used to set up the second unidirectional-use communications terminal, this second channel being, a priori, a trusted channel in that it is a short-distance channel.

The term 'representation' used herein is understood to mean any type of rendering of a piece of digital or alphanumeric data in visual or sound form (for example the emitting of light signals, sound pulses etc.). According to the present technique, the representation comprises a set of data that can be rendered by the transactional terminal and acquired by the communications terminal. According to the present technique, the representation cannot be interpreted by a human (it is not directly readable and comprehensible or audible and comprehensible). In one specific embodiment, the representation takes the form of a sequence of activations and deactivations of one or more light-emitting diodes (LEDs). In this embodiment, the communications terminal acquires the sequence of activations and deactivations of the LED or LEDs. From this succession of acquired activations and deactivations, it recreates the representation and decodes it to obtain the piece of securing data of said first communications channel. In this embodiment, the securing data of said first communications channel is an encryption key. It can also be envisaged that this piece of securing data of said first communications channel is of another nature than an encryption key (for example an identification data certificate or signature, an identifier of a transactional terminal): the principle is that the securing data of said first communications channel should be capable of enabling subsequent exchange that is secured between the two terminals, in order to reinforce the first pairing phase on the first communications channel. Be that as it may, in this embodiment, there is therefore a dual encoding of the encryption key. This is advantageous from several points of view. On the one hand, the fact that the representation can be captured from the succession of activations and deactivations of the LED or LEDs prevents a fraudulent individual from perceiving the fact that this displayed flashing contains one of the pieces of data. On the other hand, to obtain the key, it is necessary to implement a method of discovery (decoding) of the representation, which in fact is a dual encoding and increases security.

In the case of a sound sequence, the advantages produced are similar. Firstly, they are similar because the sequence is produced at the initiative of the transactional terminal and since a fraudulent person therefore does not know when it will occur. Secondly they are similar because, as in the case of the flashing of the LEDs, since the sound sequence again represents an encoding of the encryption key, it is necessary to carry out a decoding to obtain the encryption key. Thirdly, the sound sequence can be sent out on frequencies that are imperceptible to a fraudulent individual so that he cannot know when the code is sent. Depending on the embodiments, the sound sequence could for example be a DTMF sequence. Thus, in the context of the present technique, during the second pairing phase, there are several types of representations that can be used. As shall be presented here below, the different types of representations can be used jointly or successively, depending on situations.

According to the present technique, the first pairing phase (A00) is done on the whole in two steps, according to a non-secured mode that is not described in greater detail in the present document. Following this first phase of non-secured pairing, certain pieces of data have been acquired both by the transactional terminal and by the communications terminal: these are for example identification data (MAC addresses, Bluetooth for example). This first phase enables the two terminals to recognize each other and to tag the pairing as being non-secured. Subsequently to this first phase, more or less immediately afterwards, the second pairing phase (BOO) is implemented. In one particular embodiment, the first pairing phase is a "Simple Works" type of phase.

According to the present technique, the second pairing phase (BOO) is done generally in two steps:
  the transactional terminal P-Term renders (flashing of the LEDs or sound transmissions) the representations REPRS of the encryption key; as a complement, other parameters can also be rendered (address of the transactional terminal for example, this aspect is described in detail here below),
  the communications terminal Com-Term acquires (by video reading or audio recognition) the encryption key by means of the representations reader.

There is therefore no entry needed, either on the communications terminal side or on the acceptor terminal side, thus simplifying and accelerating the process (additional security guarantee). At least one pairing parameter for pairing with said communications terminal is used by the transactional terminal during the second phase: it may be the MAC address of the communications terminal, a public key of the communications terminal, an identifier of the communications terminal. This pairing parameter for pairing with the communications terminal can be used in different ways (which may or may not be used together in combination) by the transactional terminal: to generate the encryption key for example or again to encrypt the message transmitted to the communications terminal by means of the second channel, or again to update a pairing list (internal to the transactional terminal) within the memory of the transactional terminal, this list enabling the transactional terminal to identify the communications terminals with which it is paired in a secured or non-secured manner. Thus, this pairing parameter for pairing with said communications terminal can be preserved solely in the memory of the transactional terminal for future use.

A pairing validation mechanism based on an exchange of challenges/responses with authentication is then initiated and the two terminals are then connected:
  the transactional terminal P-Term builds a challenge on the basis of the encryption key which has just been transmitted by the unidirectional communications channel (LED, Buzzer) and transmits this challenge by means of the first communications channel (Bluetooth);
  the communications terminal Com-Term receives this challenge through the first communications channel and then carries out the operations needed to build its own challenge (possibly by using information contained in the first decrypted challenge) and transmits it to the transactional terminal P-Term.

When these exchanges of challenges/responses take place as expected both by the transactional terminal and by the communications terminal, the pairing is considered to be secured.

According to the present technique, it is important to have carried out a first non-secured pairing phase prior to the second secured pairing phase. Indeed, this first pairing phase enables the two terminals to exchange data and especially identification data (for example MAC addresses of the terminals) in order to carry out a pre-recognition (this is a sort of non-secured handshake). The interesting advantage of this method is that since the terminals have already been paired, the dialogue can be continued with resources that have been previously reserved during this first pairing. Advantage is taken, so to speak, of a pairing already made in order to secure it by using a second communications channel that is inaccessible to a hacker. If necessary, the transmission of the encryption key (or of other securing data) can itself be encrypted by a public key of the communications terminal, which transmits this public key through the first non-secured channel during the first pairing phase: this public key then belongs to the pairing parameters for pairing with said communications terminal, such as for example the MAC key of the communications terminal, or an identifier of the communications terminal ((IMEI, IMSI, other identifier). This reinforces the security of the proposed solution but also makes it possible not to transmit a code directly but an encrypted piece of data.

Figure 2:
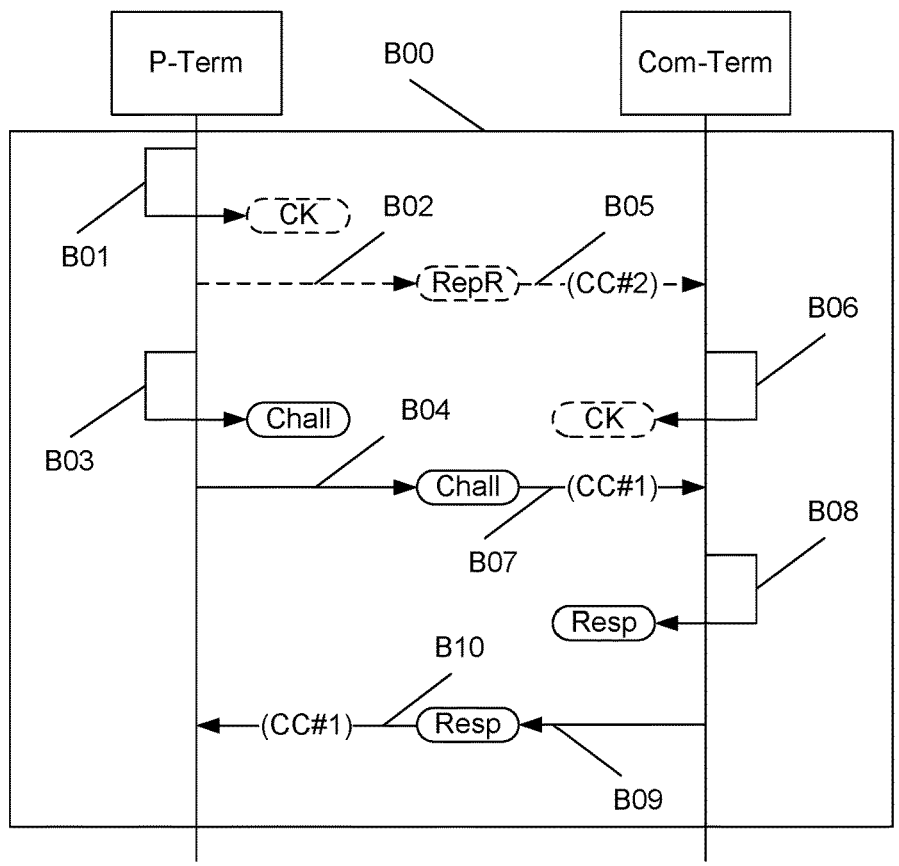

More particularly, the second pairing phase (B00) is described with reference to FIG. 2. As explained, this second phase comprises steps implemented by the communications terminal (Com-Term) and by the slave terminal (P-Term).
  a step of generation (B01) of the encryption key (CK);
  a step of transmission (B02) by means of the second unidirectional-use communications channel (CC#2), of said encryption key (CK) in the form of a representation (REPRS);
  a step of generation (B03) of a challenge (Chall) by means of said encryption key (CK);
  a step of transmission (B04), by means of the first communications channel, to said communications terminal, of said challenge (Chall);

a step of reception (B05), by means of the second unidirectional-use communications channel, of a representation (REPRS) of said encryption key (CK);

a step of decoding (B06) of said representation (REPRS) delivering said encryption key CK);

a step of reception (B07), by means of the first communications channel, of said challenge (Chall);

a step of resolution (B08) of said challenge (Chall) by means of said encryption key (CK), delivering a response (Resp); and a step of transmission (B09), by means of the first communications channel, of the response (Resp) to said challenge (Chall);

a step of reception (B10), by means of the first communications channel, of a response (Resp) to said challenge (Chall) coming from the communications terminal.

If this second pairing phase fails (in other words if the communications terminal does not have the data needed to respond to the challenge), the identifier of this terminal is "revoked" (marked as being "non-secured") and the transactional terminal (the payment terminal) will not take this terminal as the basis for exchanging exchange data (for example to carry out payment transactions). Advantageously, as an introduction to this second phase, the second terminal which is getting ready to start the secured transmission phase limits the radio sending power of the first transmission channel (for example for Bluetooth, it goes into Class Three and the power is limited to one meter): the advantage here is that it does not allow the potential hacker to capture data exchanged when he is at a long distance from the two terminals.

The encryption key is generated B10 randomly on the transactional terminal and is formed by the maximum number of characters possible, providing a high level of security on the link between the two terminals. In the case of an application using Bluetooth technology for example, the encryption key comprises 64 to 256 bits and more particularly 128 bits. In this embodiment the encryption key is a symmetrical key that can be used both by the transactional terminal and the communications terminal to encrypt the exchanges. This symmetrical encryption key can thereafter be used to build a crypto-system based on asymmetrical keys between the two terminals.

In addition, the encryption key is generated asynchronically, prior to or subsequently to the decision for pairing the communications terminal Com-Term with the transactional terminal P-Term. The decision is taken during the first pairing phase. The encryption key is random and volatile.

When two terminals are already paired, it is also possible to set up a new pairing with a new random encryption key, thus making it possible to modify the encryption keys periodically and therefore further increasing the security of this link.

The invention has been described in a particular embodiment. It is understood that the invention is in no way limited to this embodiment. The invention also relates to terminals that are used to enable the pairing as described further above. More particularly, the invention relates to an acceptor terminal of the payment terminal type. The transactional terminal comprises the following according to the present technique: non-secured pairing means (taking for example the form of a standard pairing protocol implemented in a software module), means for generating an encryption key in response to a first non-secured pairing phase, means of rendering the encryption key in the form of a representation.

All these means are driven by a computer program specifically adapted, as a function of an initial pairing protocol, to generating an encryption key, converting it into a representation and rendering this representation. The computer program furthermore comprises a phase for suspending the pairing for as long as the pairing procedure has not been completed at the level of the communications terminal.

The invention also relates to a communications terminal of the smartphone type. The communications terminal comprises, according to the present technique: means for obtaining a representation of an encryption key in response to a first non-secured pairing phase, means for decoding the acquired representation delivering an encryption key. These means for obtaining can, as indicated, consist of an optical sensor, a camera, a microphone.

All these means are driven by a computer program specifically adapted, as a function of an initial pairing protocol, to obtaining one or more representations, decoding them into an encryption key and implementing the subsequent pairing (challenges/responses). The computer program further comprises a phase of suspension of the pairing so long as the pairing procedure has not been completed at the acceptor terminal.

Figure 3:
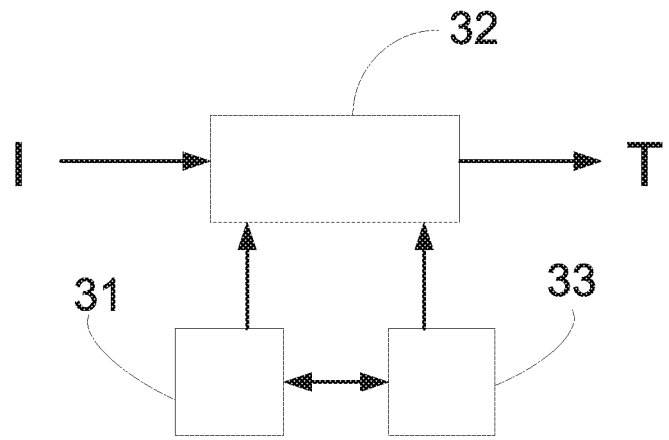
FIG. 3 is a simplified representation of a transactional terminal according to the present technique.

Referring to FIG. 3, we present an embodiment of a transactional terminal according to the present invention.

Such a transactional terminal comprises a memory 31 constituted by a buffer memory, a processing unit 32, equipped for example with a microprocessor P and driven by the computer program 33, implementing the method of modification according to the present technique.

At initialization, the code instructions of the computer program 33 are for example are loaded into a RAM and then executed by the processor of the processing unit 32. The processing unit 32 inputs at least one piece of information I such as a pairing decision. The microprocessor of the processing unit 32 implements the steps of the method for pairing described further above, according to the instructions of the computer program 33, to deliver a piece of processed information T such as the representation or representations needed for the pairing of the terminal. To this end, the terminal comprises, in addition to the buffer memory 31, the preliminarily described means. These means are driven by the microprocessor of the pairing unit 32.

Figure 4:
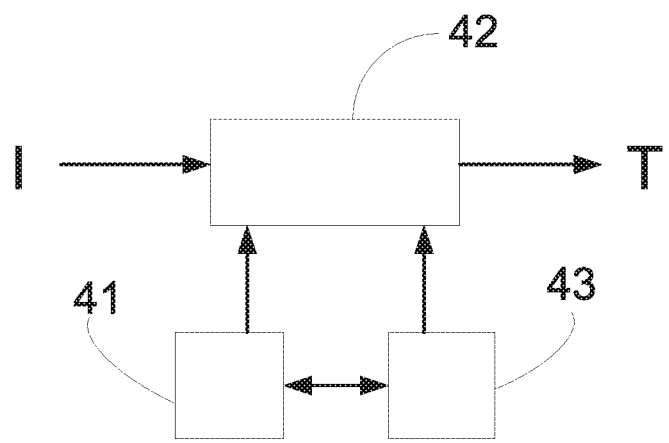
FIG. 4 is a simplified representation of a communications terminal according to the present technique.

Referring to FIG. 4, we present an embodiment of a communications terminal according to the present technique.

Such a device comprises a memory 41 constituted by a buffer memory, a processing unit 42, equipped for example with a microprocessor P and driven by the computer program 43, implementing the method of pairing according to the present technique At initialization, the code instructions of the computer program 43 are for example loaded into a RAM and then executed by the processor of the processing unit 42. The processing unit 42 inputs at least one piece of information I such as representation coming from an acceptor terminal. The processor of the processing unit 42 implements the steps of the method of modification described here above according to the instructions of the computer program 43 to deliver a piece of processed information T such as the encryption key. To this end, the device comprises, in addition to the buffer memory 41, the means described here above. These means are driven by the microprocessor of the processing unit 42.

As has been fully understood, the method of pairing as described here above includes a first sub-method of pairing that is implemented on the communications terminal and a second sub-method of pairing that is implemented on the acceptor terminal.

The invention claimed is:

1. A method comprising:
pairing a first terminal, called a communications terminal, seeking to transmit and receive data with a second terminal, called a transactional terminal, said pairing comprising:
a first pairing phase pairing said transactional terminal with said communications terminal, delivering at least one pairing parameter for pairing with said communications terminal, by using a first radio-type bidirectional wireless communications channel; and
after the first pairing phase, a second pairing phase of securing pairing of said transactional terminal with said communications terminal, said second pairing phase comprising:
limiting, by the transactional terminal, a radio sending power of the first radio-type bidirectional wireless communications channel;
implementing a second unidirectional communications channel used by said transactional terminal to transmit a piece of securing data for securing said first radio-type bidirectional wireless communications channel to said communications terminal, as a function of said at least one pairing parameter for pairing with said communications terminal, said piece of securing data being transmitted in the form of a representation as a visual or sound sequence; and
transmitting, from the transaction terminal to the communications terminal, by using the limited radio sending power first radio-type bidirectional wireless communications channel, a challenge generated by the transactional terminal as a function of the piece of securing data.

2. The method according to claim 1, wherein said second pairing phase comprises, at said transactional terminal:
generating the piece of securing data for said first radio-type bidirectional wireless communications channel;
transmission, by using the second unidirectional communications channel, of said piece of securing data for said first radio-type bidirectional wireless communications channel;
generating said challenge by using said piece of securing data for said first radio-type bidirectional wireless communications channel;
transmission of said challenge to said communications terminal by using the first radio-type bidirectional wireless communications channel;
reception, by using the first radio-type bidirectional wireless communications channel, of a response to said challenge coming from the communications terminal.

3. The method of pairing according to claim 1, wherein said second pairing phase comprises, at said communications terminal:
reception, by using the second unidirectional communications channel, of the representation of said piece of securing data for said first radio-type bidirectional wireless communications channel;
decoding said representation delivering said piece of securing data for said first radio-type bidirectional wireless communications channel;
reception, by using the first radio-type bidirectional wireless communications channel, of said challenge;
resolution of said challenge by using said piece of securing data for said first radio-type bidirectional wireless communications channel, delivering a response; and
transmission, by using said first radio-type bidirectional wireless communications channel, of the response to said challenge.

4. The method according to claim 3, wherein said reception of said representation by said communications terminal on said second unidirectional communications channel comprises acquisition of a video sequence representing said representation.

5. The method of pairing according to claim 1, wherein the securing data for said first radio-type bidirectional wireless communications channel is an encryption key.

6. The method of pairing according to claim 5, wherein said encryption key is a symmetrical encryption key.

7. The method of pairing according to claim 1, wherein the representation belongs to a type of representation and said type of representation belongs to a group consisting of:
a succession of activations and deactivations of at least one light-emitting diode;
a sound sequence.

8. The method of pairing according to claim 1, wherein said communications terminal is a smartphone type of smart terminal and wherein said transactional terminal is an enslaved payment terminal of said communications terminal.

9. A communications terminal seeking to transmit and receive data with an acceptor terminal, the communications terminal comprising:
a processor; and
a non-transitory computer-readable medium comprising instructions stored thereon, which when executed by the processor configure the communications terminal to perform acts comprising:
implementing a first phase of non-secured pairing with said acceptor terminal, by using a first radio-type bidirectional wireless communications channel;
implementing, after the first phase of non-secured pairing, a second pairing phase with said acceptor terminal by using a second unidirectional communications channel, comprising:
receiving a representation of a piece of securing data for securing said first radio-type bidirectional wireless communications channel, by using the second unidirectional communications channel, said representation taking the form of a visual or sound sequence;
decoding said acquired representation, delivering said piece of securing data for securing said first radio-type bidirectional wireless communications channel;
receiving, by using the first radio-type bidirectional wireless communications channel at a limited radio power, a challenge;
resolving said challenge by using said piece of securing data for securing said first radio-type bidirectional wireless communications channel delivering a response; and
transmitting, by using the first radio-type bidirectional wireless communications channel the response to said challenge.

10. An acceptor terminal seeking to transmit and receive data with a communications terminal, comprising:
- a processor; and
- a non-transitory computer-readable medium comprising instructions stored thereon, which when executed by the processor configure the acceptor terminal to perform acts comprising:

implementing a first non-secured phase of pairing with said communications terminal, by using a first radio-type bidirectional wireless communications channel; and implementing, after the first non-secured phase of pairing, a second pairing phase with said communications terminal by using a second unidirectional communications channel comprising:
- limiting, by the acceptor terminal, a radio sending power of the first radio-type bidirectional wireless communications channel;
- generating a piece of securing data for securing said first radio-type bidirectional wireless communications channel, enabling the pairing of said acceptor terminal and said communications terminal;
- transmission, by using the second unidirectional communications channel, of said piece of securing data for said first radio-type bidirectional wireless communications channel, said piece of securing data being transmitted in the form of a representation as a visual or sound sequence; and
- transmitting, from the acceptor terminal to the communications terminal, by using the limited radio sending power first radio-type bidirectional wireless communications channel, a challenge generated by the acceptor terminal as a function of the piece of securing data.

11. A non-transitory computer-readable medium comprising a computer program product stored thereon, which comprises program code instructions for the execution of a method of pairing a first terminal, called a communications terminal, seeking to transmit and receive data with a second terminal, called a transactional terminal, when executed by a processor of the transactional terminal, said pairing comprising:
- a first pairing phase pairing said communications terminal with said transaction terminal, delivering at least one pairing parameter for pairing with said transaction terminal, by using a first radio-type bidirectional wireless communications channel; and
- after the first pairing phase, a second phase of securing pairing of said communications terminal with said transaction terminal, said second pairing phase comprising:
  - limiting, by the transactional terminal, a radio sending power of the first radio-type bidirectional wireless communications channel;
  - implementing a second unidirectional communications channel used by said communication terminal to receive from said transactional terminal a piece of securing data for securing said first radio-type bidirectional wireless communications channel, as a function of said at least one pairing parameter for pairing with said communications terminal, said piece of securing data being transmitted in the form of a representation as a visual or sound sequence
  - transmitting, from the transaction terminal to the communications terminal, by using the limited radio sending power first radio-type bidirectional wireless communications channel, a challenge generated by the transactional terminal as a function of the piece of securing data.

* * * * *